J. O. FRILICK.
PIPE JOINT REINFORCING ATTACHMENT.
APPLICATION FILED DEC. 17, 1914.
1,197,813. Patented Sept. 12, 1916.
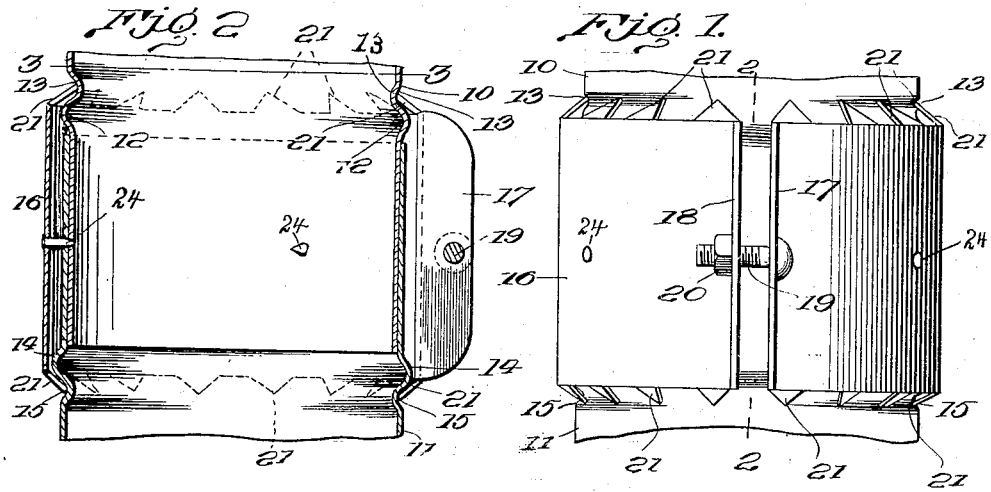
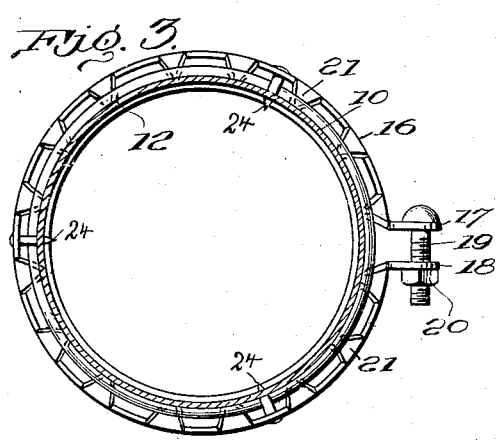
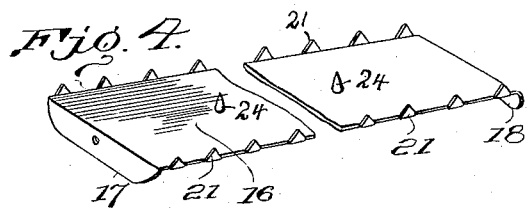

UNITED STATES PATENT OFFICE.

JOSEPH OSBORN FRILICK, OF EL PASO, TEXAS.

PIPE-JOINT-REINFORCING ATTACHMENT.

1,197,813.     Specification of Letters Patent.     Patented Sept. 12, 1916.

Application filed December 17, 1914. Serial No. 877,746.

*To all whom it may concern:*

Be it known that I, JOSEPH O. FRILICK, a citizen of the United States, residing at El Paso, in the county of El Paso and State of Texas, have invented certain new and useful Improvements in Pipe-Joint-Reinforcing Attachments, of which the following is a specification.

This invention relates to improvements in devices for reinforcing and protecting pipe joints, more particularly stove pipes and like devices, and has for one of its objects to improve the construction and increase the efficiency and utility of devices of this character.

Another object of the invention is to provide a simply constructed device which automatically adapts itself to the expansion and contraction of the pipe sections caused by changes in the temperature, so that a tight joint is maintained at all times.

Another object of the invention is to provide a device of this character adapted to be attached to the overlapping ends of sections of piping to firmly support the same and provide a free circulation of air between the pipe sections and the attachment.

Another object of the invention is to provide a simply constructed device which may be readily applied without structural change to pipe joints of various sizes and lengths.

With these and other objects in view, the invention consists in certain novel features of construction as hereafter shown and described and then specifically pointed out in the claim; and in the drawings illustrative of the preferred embodiment of the invention, Figure 1 is a side elevation of the improved joint; Fig. 2 is a section on the line 2—2 of Fig. 1; Fig. 3 is a section on the line 3—3 of Fig. 2. Fig. 4 is a perspective view on a reduced scale of the blank from which the attachment is formed.

Corresponding and like parts are referred to in the following description and indicated in all the views of the accompanying drawings by the same reference characters.

The improved device is designed more particularly for use for reinforcing the joint between the terminals of stove pipe sections and similar devices, and also to provide a constant circulation of air around the joint and longitudinally of the same.

In the drawings, the improved device is shown applied to the confronting and interlapping ends of co-acting pipe sections, one section being represented conventionally at 10 and the other section at 11. The pipe sections are arranged to telescope for a short distance, in the illustration the pipe section 10 being inserted for a short distance within the pipe section 11. The section 10 is provided with the usual annular stop bead 12 and the usual annular channel 13 which is sunken below the outer surface of the body of the pipe section. The pipe section 11 is likewise provided with the usual annular outwardly directed bead 14 and the annular inwardly directed channel 15 which extends below the outer surface of the section 11. By this means a sunken channel 13 is provided adjacent to the terminal of the section 11, while a similar sunken channel 15 is provided adjacent to the terminal of the section 10 with an annular bead or outwardly directed rib 12 between the channel 13 and the terminal of the pipe section 11, and an annular bead between the channel 15 and the adjacent terminal of the section 10.

Surrounding the interlapping terminals of the pipe sections, is a divided band 16, outturned at its terminals as shown at 17—18, the outturned portions being provided with a clamp bolt 19 and clamp nut 20. At its ends the member 16 is formed with a plurality of inwardly directed teeth or projections 21 which engage by their terminals against the pipe sections and preferably within channels 13—15 as shown. By means of the teeth or projections 21 the band is spaced from the pipe sections at the joint and air permitted to pass through the openings between the teeth and over the contiguous portions of the joint. A plurality of teeth or studs 24 may also be supported in the body portion of the band 16 and penetrate the pipe sections as shown, to more firmly support the band in place and materially increase its grip upon the pipe sections. By this arrangement, it will be obvious that when the member 16 is disposed around the pipe sections, with the inwardly directed teeth 21 engaging in the channels, the studs 24 penetrating the pipe material, and the bolt 19 tightened by rotating the nut 20, the member 16 will be clamped around the pipe sections and the teeth 21 firmly compressed against the outer face of the same within the channels. By this means, the member 16 firmly grips the pipe sections and holds them firmly in position and effectually prevents any longitudinal movement between the pipe sections. By this means also the joint is materially strengthened and stiffened and all danger of the separation of the parts, under pulling strain, obviated.

The improved device will be found of a special advantage in reinforcing and protecting the joints between stove pipes which are carried for long distances in rooms, and obviates the necessity for supporting the pipe at frequent intervals from the ceiling or walls of the room, as a stove pipe supported and reinforced by the improved attachment will possess sufficient rigidity to require support at the ends only. By forming the member 16 with the numerous teeth or points 21, the member 16 is caused to engage the pipe sections closely and firmly, and readily adapts itself to any irregularities in the outlines of the pipe sections, so that all parts of the member 16 are held with equal firmness against the pipe sections.

It will be noted that the band member 16 is considerably larger than the pipe sections and is therefore spaced from the pipe sections and provides for free circulation of air both around and longitudinally of the pipe sections which protects the material and prevents the loosening of the reinforcing member by expansion and contraction, and effectually prevents the accumulation of moisture when no fire is in the stove or furnace from which the pipes lead. This is an important feature of the present invention and materially increases its efficiency and utility. The improved device is simple in construction, can be inexpensively manufactured, and materially strengthens and protects the pipe sections.

Having thus described the invention, what is claimed as new is:

The combination with the adjacent ends of coacting pipe sections of a band extending around the pipe sections and having inwardly directed pointed teeth at the ends and spaced apart, and means for compressing said band around the pipe sections to cause the teeth to bite into the same, whereby the band is maintained in spaced relation to the pipe sections to provide free passage for the air and the band supported from displacement longitudinally of the pipe sections and the pipe sections held from displacement longitudinally of each other.

In testimony whereof I affix my signature in presence of two witnesses.

JOSEPH OSBORN FRILICK. [L. S.]

Witnesses:
O. W. GOODWIN,
J. B. KILPATRICK.

Copies of this patent may be obtained for five cents each, by addressing the "Commissioner of Patents, Washington, D. C."